United States Patent Office 3,639,572
Patented Feb. 1, 1972

3,639,572
EYELINER COMPOSITION
Herbert W. Heinrich, Ridgewood, N.J., and Ingeborg M. Schmitt, Flushing, N.Y. (both % Chas. Pfizer & Co., 235 E. 42nd St., New York, N.Y. 10017)
No Drawing. Continuation-in-part of application Ser. No. 419,575, Dec. 18, 1964. This application Feb. 27, 1967, Ser. No. 619,018
Int. Cl. A61k 7/02
U.S. Cl. 424—63                                    1 Claim

ABSTRACT OF THE DISCLOSURE

Water-resistant liquid makeup for the skin of the eyelids may be formulated on the basis of an aqueous dispersion of water-insoluble addition polymer in combination with polyhydric alcohol, pigment, water-insoluble inorganic silicate and optional ingredients as detailed in the disclosure.

CRASS REFERENCE TO RELATED APPLICATION

This application is a continuation-in-part of application Ser. No. 419,575, filed Dec. 18, 1964, now abandoned.

BACKGROUND OF THE INVENTION

This invention is concerned with cosmetic compositions for application to the skin, and more particularly with rub-proof, stain-proof liquid makeup.

In the past, both dry and liquid makeup preparations, i.e. face powder, cake makeup and makeup cream, have been applied to the skin for cosmetic purposes. Each of these preparations, however, will rub off on the clothing, and they are therefore particularly unsatisfactory for application to the neck. Furthermore, the conventional cosmetics are subject to staining and smearing by moisture, and may be rendered unsightly by perspiration or rain.

SUMMARY OF THE INVENTION

A novel group of water-based makeup compositions have now been discovered which are entirely free from these important disadvantages. They are not only water-resistant, but rub-proof, and stain-proof as well. Accordingly, they may be applied to the face and neck to a point below the clothing line without risk of soiling the blouse or coat. These elegant new cosmetics are also excellent for application to the arms and legs, as well as to the face and eyelids. When applied, they quickly dry to a natural-appearing film which is permeable to perspiration and oil. In spite of their moisture-resistance, the novel cosmetics of the present invention are readily removed from the skin by cleansing cream or by soap and water.

The compositions which exhibit these significant advantages are aqueous dispersions of water-insoluble addition polymer, containing polyhydric alcohol humectant, finely divided inert pigment and finely divided inorganic silcate.

DETAILED DESCRIPTION OF THE INVENTION

Any non-toxic, water-insoluble addition polymer in aqueous dispersion is suitable. The expression "non-toxic" as used herein is intended to exclude substances which would have irritating or other adverse effect on the skin or eyes in normal use. Polyvinyl acetate, polyvinyl butyral, vinyl chloride-vinyl acetate copolymers, vinyl pyrolidone-vinyl acetate copolymers, and polyacrylic esters are a few of the polymers which provide excellent tack-free, flexible films. Others will readily occur to those skilled in the art. Particularly preferred for their excellent film-forming properties are the polyacrylic esters, especially copolymers of alkyl acrylates and methacrylates, e.g. ethyl acrylate with methyl methacrylate. These resins are commercially available in aqueous emulsion from a variety of sources, and usually contain small concentrations of one or more anionic and/or nonionic surface active agents. The commercial resins are usually prepared by copolymerization of about 30–40% by weight methyl methacrylate with about 60–70% ethyl acrylate; a minor proportion of an $\alpha,\beta$-unsaturated carboxylic acid such as acrylic, methacrylic or itaconic acid may also be included in the copolymer. There is, of course, no need to rely upon commercially available resins for use in the new cosmetic formulations; appropriate addition polymer aqueous dispersions may, if desired, be specifically prepared by standard polymerization methods, particularly by emulsion polymerization. The techniques employed are quite well known, fully described in the literature, and exemplified hereinafter. Interpolymers of ethyl and butyl acrylate with butyl methacrylate give excellent results.

The proportion of water-insoluble addition polymer employed in the new cosmetic formulations may vary over a wide range. For most applications, a level of about 3–7% w./v. (i.e. grams per 100 ml.) will be preferred for an optimum combination of permanence and natural appearance, but levels below 3% or above 7% may also be used if desired.

The humectant may be any polyhydric alcohol, for example, a glycol such as ethylene glycol, propylene glycol, butylene glycol, diethylene glycol, triethylene glycol, dipropylene glycol, or the polyethylene glycols marketed under various trade names. Alternatively, other polyols such as sorbitol or glycerine may be used. A particularly preferred humectant is propylene glycol. Levels of about 2.5% w./v. or higher are usually appropriate, but even lower concentrations also offer beneficial effect. For face-, arm- and leg makeup, humectant levels of 2.5–5% are best.

The inert pigment or pigments, which may be inorganic or organic in nature, are employed in the form of fine powder. They should, of course, be pharmaceutically acceptable, i.e. non-irritating to the skin and eyes, and free of adverse or unpleasant properties or effect at the level of ordinary use. Suitable pigments include the various red, yellow and black iron oxides, titanium dioxide, the Drug and Cosmetic colors, eye shadows such as Prussion blue, ultramarine blue, iron blues, chrome green, carbon black, and the like. For optimum hiding power, a total pigment level of at least about 5% w./v. is desirable; there is usually no added advantage in employing more than about 20% w./v., and higher levels than this may detract from the natural effect. The color may be formulated in a variety of shades, to match the skin, or to lighten or darken the complexion, as desired.

In addition, a finely divided inorganic silicate is included as a dispersing and flatting agent. Various magnesium silicates, calcium silicates, magnesium aluminum silicates, aluminum silicates, and colloidal silica itself, are among the silicates which are suitable for this purpose. Specific examples include bentonite, fuller's earth, talc, kaolin and their synthetic counterparts. All of these are substantially water-insoluble. They are widely available in fine particle size, exhibiting high bulking properties. At least about 0.5% w./v. should be employed.

The new aqueous-based makeup preparations should be substantially neutral, having a pH between about 6.5 and 8. A pH of approximately 7.5 is best.

Among the optional ingredients which may be added are the pharmaceutically acceptable surface active agents. While all types are usable, nonionic and especially anionic surfactants are preferred. Suitable agents include triethanolamine salts of alkanoic acids, sorbitan monoalkanoates, and polyoxyethylene sorbitan monoalkanoates, such as the stearates, palmitates, oleates and laurates; as well as polyoxyethylene alkyl ethers, including the stearyl, cetyl, oleyl and lauryl ethers. Emulsion stabilizers such as glyceryl monostearate and stearyl monoglyceridyl citrate may also be included. An appropriate surfactant level is 1.5% w./v. or higher, and preferably 3% or higher, although there is little or no added advantage to levels above about 6%.

Where the foregoing surfactant levels are employed, it is frequently beneficial to incorporate an oleaginous emollient, for lubricant or plasticizing effect and most natural appearance. A preferred class of emollients is the ester type, including vegetable oils such as safflower oil and other glycerides, as well as alkyl myristates, e.g. isopropyl and isocetyl myristates. Another preferred class are the mineral or hydrocarbon oils. Other suitable emollients include lanolin and lanolin derivatives, silicone oils, and the higher alkanols, such as cetyl and stearyl alcohols. An emollient level of about 1% w./v. or more is preferable, especially between about 1 and 3%. Even higher levels can, of course, also be used.

If no surfactant is employed, beyond the trace already usually present in the water-insoluble addition polymer, it is best to include a water-soluble resin in the formulation to aid in dispersing the pigments. Any non-toxic, water-soluble addition polymer can be used, such as polyvinyl alcohol or the salts of various polyelectrolytes, e.g. polyacrylic and polymethacrylic acids. Levels between about 2 and 4% w./v. are appropriate.

Cosmetics such as eye shadow and eye-liner, for application to the skin of the eyelids by pen or brush, may be formulated in accordance with the invention, and these possess all the advantages set forth above. These will ordinarily employ the darker shades of pigment, such as the blues, greens, umbers and blacks. For eye-liner, the level of the finely divided inorganic silicate is preferably at least about 2% w./v., and levels of 15–30% or more are often appropriate. Likewise, in this particular type of formulation, the humectant level ought to be at least about 5%, e.g. about 5–10%, for an elegant product, and the oleaginous emollient will then usually be omitted.

As with most liquid and cream cosmetics, it is prudent to include a preservative or fungistat in the new products of this invention. Those suitable include formaldehyde, alkyl parahydroxybenzoates, orthophenyl phenol, sorbic acid or its salts, tetrachlorosalicylanilide, p-chlorophenyl glycerol ether, and similar agents. Concentrations of about 0.1–0.8%, depending upon the particular agent selected, are customary.

Perfumes, antiseptics, stimulants for peripheral circulation, and sun screen agents are other optional ingredients. Examples include hexachlorophene, resorcinol, allantoin and sulfur preparations. Some of these may be used if a mildly medicated product is desired, e.g. for users with acne or incipient facial blemishes.

The various ingredients chosen are merely combined, with suitable agitation, to produce a stable, uniform dispersion in liquid or cream form. The resulting cosmetic products when applied to the skin exhibit the highly desirable rub-proof, stain-proof properties detailed hereinbefore; they are readily removed with cleansing cream or soap and water when desired.

The following examples are provided for illustrative purposes and should not be construed as limiting the invention, the scope of which is defined by the appended claims.

EXAMPLE 1

(A)

| Oil phase: | Grams |
|---|---|
| Palmitic acid | 1.5 |
| Stearic acid | 1.5 |
| Glyceryl monostearate | 1.5 |
| Marcol 90 [a] | 1.0 |
| Viscolan [b] | 1.2 |
| Orthophenyl phenol | 0.2 |

[a] Low viscosity white oil available from Esso.
[b] Lubricant oil available from American Cholesterol Co.

(B)

| Aqueous phase: | Grams |
|---|---|
| Propylene glycol | 5.0 |
| Triethanolamine | 1.3 |
| Veegum [c] | 15.0 |
| Deionized water | 58.9 |

[c] 5% aq. dispersion of magnesium aluminum silicates available from R. T. Vanderbilt Co.

(C)

| | |
|---|---|
| Pigments _____grams__ | 5.0 |

Pigment composition (micropulverized twice):

| | |
|---|---|
| Talc 140 [d] _____percent__ | 12–18.5 |
| Titanium dioxide [e] _____do____ | 49–82 |
| Red Oxide A-6205 [e] _____do____ | 1.3–8.5 |
| Yellow Ochre C-1624 [e] _____do____ | 3.2–32 |
| Cosmetic Black A-8214 [e] _____do____ | 0.14–2 |
| Cosmetic Umber 1985 [e] _____do____ | 0.04–1 |
| D & C Red No. 30 K-7156 [e] _____do____ | 0.1–1.1 |

[d] Available from Whittaker, Clark & Daniels Co.
[e] Available from Kohnstamm Co.

(D)

Aqueous emulsion, water-insoluble addition polymer 7.5 grams

The aqueous phase (B) is heated to 70° C. and the pigments (C) dispersed therein with stirring. The aqueous polymer emulsion (D) is then introduced, and the mixture reheated to 70° C. Next, the oil phase (A) is heated to 70° C. and introduced slowly with stirring. The mixture is then cooled with stirring, 0.3 g. perfume being introduced when the temperature reaches 45° C., and 0.1 g. formaldehyde at 30° C. The cosmetic product is now ready for packaging.

Preparation of aqueous polymer emulsion D

The emulsion of water-insoluble addition polymer for the foregoing formulation is prepared in a two-stage emulsion polymerization, as follows:

First stage

| | |
|---|---|
| Ethyl acrylate _____grams__ | 69.3 |
| Methyl methacrylate _____do____ | 40.8 |
| Methacrylic acid _____do____ | 1.68 |
| Deionized water _____do____ | 207 |
| Triton X-200 [f] _____do____ | 13.2 |
| Ferrous sulfate soln.[g] _____do____ | 2.2 |
| Ammonium persulfate _____do____ | 1.1 |
| Sodium metabisulfite _____do____ | 1.1 |
| t-Butyl hydroperoxide _____drops__ | 6 |

[f] 28% alkaryl ether of polyethoxyethanol, available from Rohm & Haas Co.
[g] Solution of 0.3 g. ferrous sulfate heptahydrate in 200 ml. deionized water.

The first six ingredients are homogenized with stirring, flushed with nitrogen, and adjusted to 20° C. in a flask equipped with reflux condenser. Half of each of the remaining three items is then introduced (zero time) in the order listed and about one minute apart. At 42 minutes' reaction time the remainder of the three initiators is added, and at one hour heat is applied to raise the temperature from 24° C. to 45° C. in 10 minutes. Heating is then discontinued and the reaction becomes exothermic, the temperature rising to 84° in 8 minutes. After a total of 95 minutes the reaction mixture is cooled for addition of the second stage ingredients.

Second stage

| | | |
|---|---|---|
| Ethyl acrylate | grams | 69.2 |
| Methyl methacrylate | do | 40.7 |
| Methacrylic acid | do | 1.67 |
| Deionized water | do | 47.5 |
| Triton X-200 [f] | do | 13.2 |
| Ferrous sulfate soln.[g] | do | 2.2 |
| Ammonium persulfate | | [1] 0.55 |
| Sodium metabisulfite | | [1] 0.55 |
| t-Butyl hydroperoxide | drops | 3 |

[1] Grams in 2.75 ml. water.
[f, g] See first stage above.

The first six ingredients are mixed together and slowly poured into the cooled first stage reaction mixture, followed by the three initiators. Heat is then reapplied to raise the temperature to 45° C., whereupon an exothermic reaction ensues, the temperature rising to 79°. After 2.5 hours (55 minutes of the second stage) the reflux condenser is removed and unreacted monomer distilled off by heating for about 30 minutes longer.

After cooling, the reaction mixture is adjusted to pH 7.6 with ammonia, filtered through cheesecloth, and the filtrate (45% solids) set aside for use as item (D) above.

EXAMPLE 2

Five additional cosmetic formulations are prepared by the procedure of Example 1, with alteration in the proportion of some of the ingredients, as tabulated below. Those ingredients not listed below are employed in the same quantity as in Example 1.

| | | (1) | (2) | (3) | (4) | (5) |
|---|---|---|---|---|---|---|
| (A) | Marcol 90, g | 1 | 1.5 | 2 | 2 | 3 |
| (B) | Propylene glycol, g | 5 | 4 | 4 | 3 | 2.5 |
| | Veegum, g | 16 | 19 | 17 | 18 | 20 |
| | Deionized water, g | 54.4 | 52.9 | 49.4 | 45.4 | 34.4 |
| (C) | Pigments, g | 5 | 7 | 10 | 15 | 20 |
| (D) | Aqueous polymer emulsion, g | 11 | 8 | 10 | 9 | 12.5 |

The above preparations are repeated, substituting equal quantities of isopropyl myristate or safflower oil for the Marcol. Likewise, Dow-Corning Silicone Oil DC 200 is substituted in equal quantity for the Marcol in a further series of formulations.

EXAMPLE 3

The cosmetic products of Examples 1 and 2 are reformulated by substituting for the aqueous emulsion polymer D an equal quantity of Polyco 2719. This aqueous emulsion, available from Bordon Chemical Co., contains 46–47% total solids, the resin being an interpolymer of about 63% ethyl acrylate and 37% methyl methacrylate with a small proportion of itaconic acid. The 3% emulsifier content consists of Triton X-200 and Triton sulfate.

Two additional series of formulations are likewise prepared, substituting equal quantities of glycerine, and sorbitol, respectively, for the propylene glycol of the earlier formulations.

EXAMPLE 4

| | G. |
|---|---|
| Propylene glycol | 5.0 |
| Carbowax 400[h] | 5.0 |
| Veegum[c] | 20.0 |
| Pigments[i] | 7.5 |
| Cab-o-sil M-5[j] | 1.0 |
| Methyl parahydroxybenzoate[k] | 0.25 |
| Perfume | 0.2 |
| Deionized water | 43.0 |
| Calgon[l] | 3.0 |
| Carboset 511[m] | 5.0 |
| Aqueous emulsion, water-insol. addition polymer[n] | 10.0 |

[h] Polyethylene glycol available from Carbide & Carbon.
[i] As specified in Example 1.
[j] Colloidal silica available from Godfrey L. Cabot Co.
[k] Preservative.
[l] Sodium hexametaphosphate with sodium carbonates, available from Calgon Co.
[m] Water solution of acrylic film-forming polymer containing 45% total solids at pH 7.8–8.2, available from B. F. Goodrich Chemical Co.
[n] As prepared in Example 1.

The preservative and perfume are dissolved in the propylene glycol, and the Carbowax and Veegum dispersion are added with stirring, followed by the pigments and the silica. The Calgon is then dissolved in a little warm water and added, and the polymer solution and the aqueous polymer emulsion are successively diluted with water and added. The remainder of the water is finally added, and the finished cosmetic formulation stirred to homogenize.

EXAMPLE 5

Five additional cosmetic formulations are prepared by the procedure of Example 4, with alteration in the proportion of some of the ingredients, as tabulated below. Those ingredients not listed below are employed in the same quantity as in Example 4.

| | (1) | (2) | (3) | (4) | (5) |
|---|---|---|---|---|---|
| Propylene glycol, g | 6 | 7 | 8 | 9 | 10 |
| Veegum, g | 40 | 35 | 30 | 25 | 20 |
| Pigments, g | 10 | 9.5 | 9 | 8.5 | 8 |
| Deionized water, g | 12 | 18 | 24 | 30 | 36 |
| Acrylic polymer solution, g | 7.5 | 7 | 6.5 | 6 | 5.5 |
| Aqueous polymer emulsion, g | 15 | 14 | 13 | 12 | 11 |

EXAMPLE 6

The cosmetic products of Examples 4 and 5 are reformulated by substituting an equal quantity of Borden Polyco 2719 acrylic copolymer emulsion for the aqueous emulsion polymer of those earlier examples.

Two additional series of formulations are likewise prepared, substituting equal quantities of glycerine, and sorbital, respectively, for the propylene glycol of the earlier formulations.

EXAMPLE 7

The cosmetic formulations of Examples 1–6 are repeated with the addition of 1 g. resorcinol, and deletion of the perfume, for mild acne medication.

EXAMPLE 8

Liquid eye liners, suitable for application by brush, are formulated to the compositions listed below.

|  | Parts by weight | |
| --- | --- | --- |
|  | Brown formula | Black formula |
| Propylene glycol | 10.00 | 10.00 |
| Veegum HV (o) | 25.00 | 18.75 |
| Cab-o-sil M-5 (j) | 2.00 | 1.50 |
| Colloidal channel carbon black | 1.50 | 5.00 |
| Cosmetic Umber 1985 (e) | 10.50 | |
| Methyl parahydroxybenzoate (k) | 0.10 | 0.10 |
| Propyl parahydroxybenzoate (k) | 0.10 | |
| Water | 38.96 | 46.10 |
| Isoteric acid | 3.00 | |
| Ammonium hydroxude, reagent grade | | 0.15 |
| 2-amino-2-methyl-1,3-propanediol (p) | 1.00 | |
| Sodium dioctyl sulfosuccinate (q) | 0.66 | 0.46 |
| Sorbitan monolaurate (p) | 0.50 | |
| Brij 58 (r) | | 1.00 |
| Antifoam | 0.05 | 0.05 |
| Addition polymer (s) | 6.90 | 6.89 |
| Elvanol 70-05 (t) | | 10.00 |
| Total | 100.00 | 100.00 |

(o) 4% aq. dispersion of magnesium aluminum silicates available from R. T. Vanderbilt Co.
j e k Same as above, Example 4.
(p) Surface active agent.
(q) 75% aqueous solution.
(r) 25% aqueous solution of polyoxyethylene (20) cetyl ether available from Atlas Chemical.
(s) 43.5% aqueous dispersion of butyl acrylate:ethyl acrylate:butyl methacrylate-methacrylic acid 20:15:60:5 copolymer.
(t) 10% aqueous solution of low viscosity, 98.5-100% hydrolyzed grade of polyvinyl alcohol, available from Du Pont.

What is claimed is:
1. A rub-proof, stain-proof, water-resistant liquid eyeliner comprising a substantially neutral stable aqueous dispersion of about 3–7% w./v. of a non-toxic water-insoluble, film-forming copolymer of butyl acrylate, ethyl acrylate, butyl methacrylate and methacrylic acid in the relative proportions by weight of 20:15:60:5, at least about 5% w./v. of propylene glycol, about 5–20% w./v. of a pharmaceutically acceptable finely divided inert pigment, and about 0.75%–1% w./v. of finely divided magnesium aluminum silicate together with between about 1.5% and 2% of colloidal silica.

References Cited

UNITED STATES PATENTS

| 3,266,995 | 8/1966 | Lanzet et al. | 424—63 |
| 3,226,297 | 12/1965 | Ekenstam et al. | 167—93 |
| 2,624,690 | 1/1953 | Leader | 167—58 |
| 2,678,902 | 5/1954 | Mehaffey | 167—91 |
| 2,980,655 | 4/1961 | Glass et al. | 167—85 |
| 3,250,680 | 5/1966 | Menkart et al. | 167—85 |

OTHER REFERENCES

Drug and Cosmetic Industry, 5/1945, vol. 56, No. 5, p. 625.

January Soap, Perfumery and Cosmetics, 9/1948, vol. 21, No. 9, pp. 909–912.

American Perfume and Essential Oil Review, 1955, vol. 65, No. 1, pp. 24–26.

ALBERT T. MEYERS, Primary Examiner

D. R. ORE, Assistant Examiner

UNITED STATES PATENT OFFICE
CERTIFICATE OF CORRECTION

Patent No. 3,639,572  Dated February 1, 1972

Inventor(s) Herbert W. Heinrich and Ingeborg M. Schmitt

It is certified that error appears in the above-identified patent and that said Letters Patent are hereby corrected as shown below:

Col. 1, lines 4 and 5, "(both .... N.Y. 10017)" should read -- , assignors to Pfizer Inc., New York, N.Y. --

Col. 7, line 17, "38.96" should read -- 38.69 --;

between lines 17 and 18, "isoteric" should read -- isostearic --;

line 18, "hydroxude" should read -- hydroxide --.

Signed and sealed this 11th day of July 1972.

(SEAL)
Attest:

EDWARD M. FLETCHER, JR.
Attesting Officer

ROBERT GOTTSCHALK
Commissioner of Patents